Figure 1:
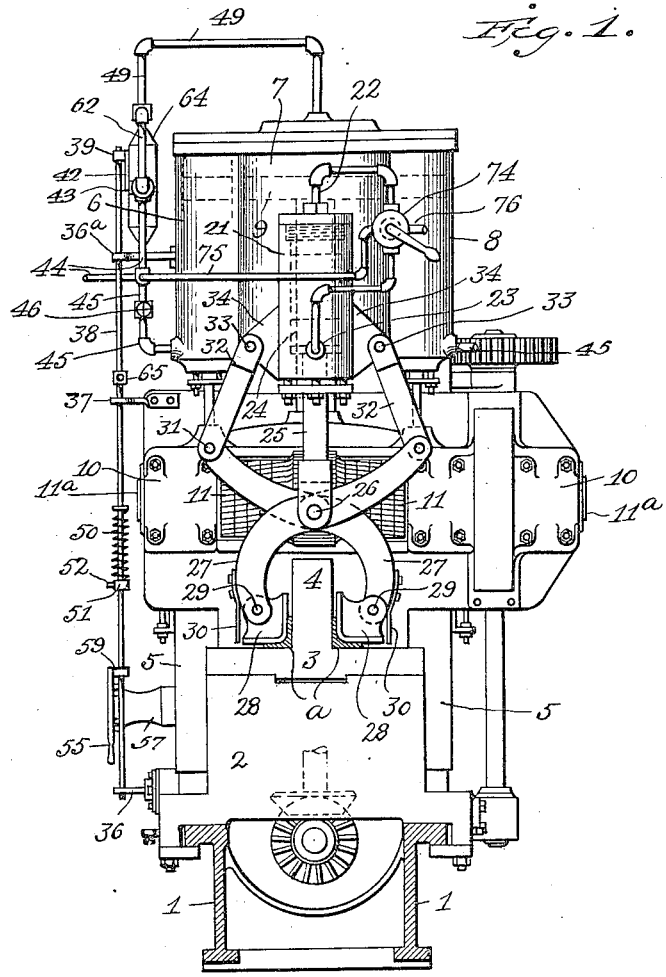

P. A. CUENOT & L. G. FISCHER.
MILLING MACHINE.
APPLICATION FILED APR. 15, 1911.

1,045,817.

Patented Dec. 3, 1912.

2 SHEETS—SHEET 1.

Witnesses
R. W. Sommers
Elizabeth Leckert

Inventors
Paul A. Cuenot and
Lewis G. Fischer
By Henry Orth Jr.
Attorney

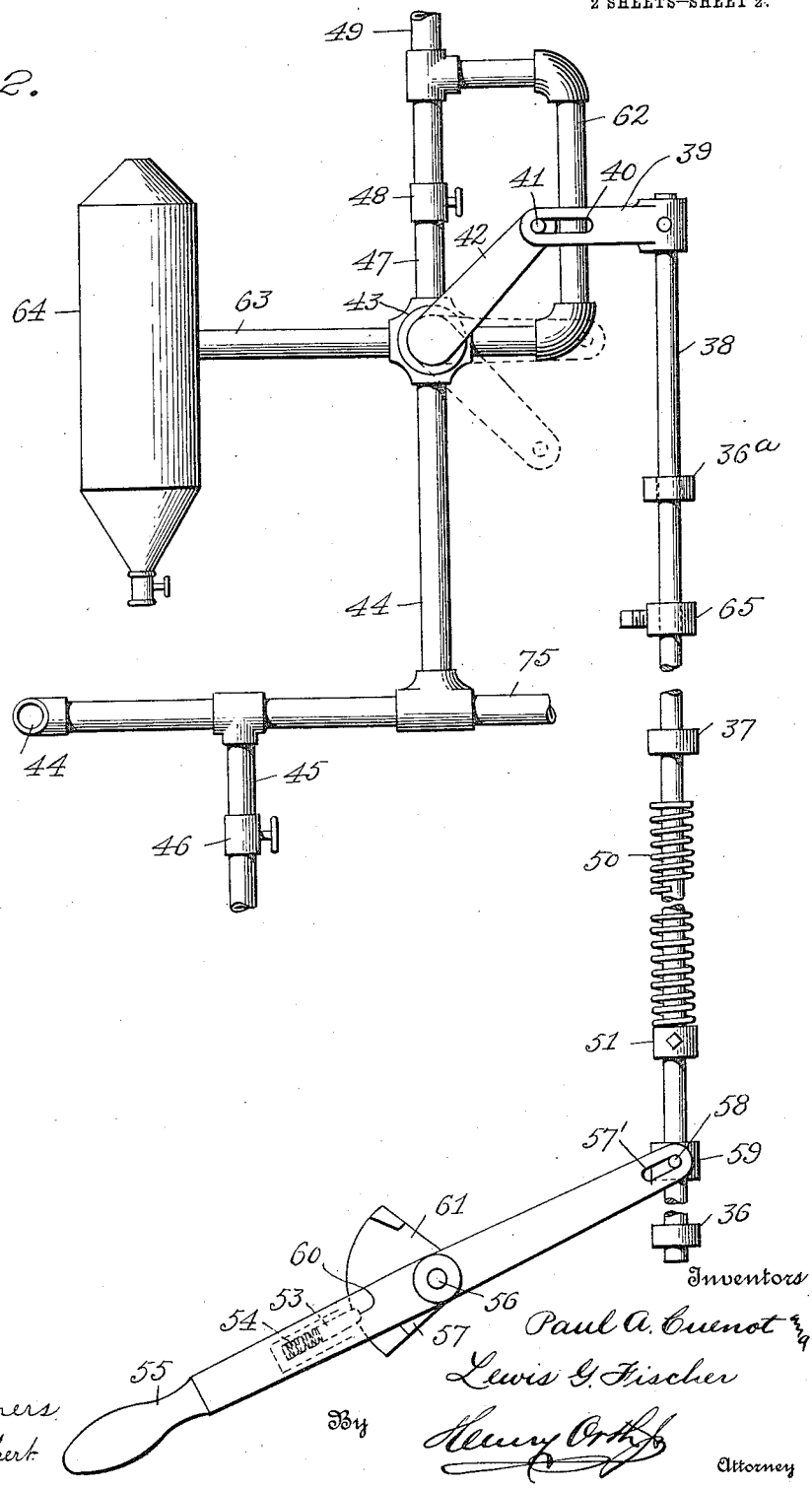

UNITED STATES PATENT OFFICE.

PAUL A. CUENOT, OF STEELTON, AND LEWIS G. FISCHER, OF HARRISBURG, PENNSYLVANIA.

MILLING-MACHINE.

1,045,817.   Specification of Letters Patent.   Patented Dec. 3, 1912.

Original application filed January 15, 1910, Serial No. 538,304. Divided and this application filed April 15, 1911. Serial No. 621,342.

*To all whom it may concern:*

Be it known that we, PAUL A. CUENOT and LEWIS G. FISCHER, citizens of the United States, and residents, respectively, of Steelton and Harrisburg, both in the county of Dauphin and State of Pennsylvania, have invented certain new and useful Improvements in Milling-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to milling machines, being a division of our application Serial No. 538,304, filed Jany. 15, 1910, and has for its object to provide an efficient and readily operated machine for milling or chamfering the ends of plates, angles, beams and other structural iron and steel shapes.

The machine is provided with a sliding head carrying one, or a group of, milling cutters, fed across the face of the work by fluid-actuated mechanism, with fluid-actuated means to effectually clamp the work under uniformly distributed pressure while being milled, and with details of construction hereinafter more fully described, and particularly pointed out in the claims.

Referring to the drawings in which like parts are similarly designated, Figure 1 is a front elevation of a milling machine embodying our invention. Fig. 2 is an enlarged detail view of the air or other fluid distributing system.

On a suitable base 1 is secured a work-supporting table 2 having a removable top 3. This top as shown is constructed to receive and sustain a particular shape, to-wit, angles, and to this end is provided with a vertical rib 4. Other shaped tops are intended to replace this particular shaped top when necessary, to properly support other shapes of structural iron or steel not adapted for support on this particular table top.

On the base 1 is mounted a frame 5, having three cylinders, 6, 7, and 8, of which the middle one 7 is the largest and contains a piston 9 that is connected to the vertically movable milling tool head 10 and operates to move this head, with the tool 11 therein, downward. The other, smaller, cylinders, 6 and 8, contain pistons also suitably connected to the head 10 near its sides, and operate to raise the head 10 when the pressure on the large piston 9 is removed.

The milling tool or tools 11 are mounted on an arbor 11$^a$ which is operated in any suitable manner.

21 designates a cylinder having an air inlet pipe 22, and an air outlet pipe 23, and contains a piston 24 whose piston rod 25 is connected by pin 26 to floating levers 27, there being two such floating levers pivoted together intermediate their ends by pin 26. The lower ends of these levers carry shoes 28 conforming to or fitting the particular structural shape to be treated in the machine. These shoes are preferably, but not necessarily, pivoted at 29 to the ends of the levers 27, and are limited in their outward swing on their pivots 29 by spring or other stops 30 secured to the levers 27 and against which said shoes may rest. The upper ends of said levers 27 are pivotally connected at 31 to links 32 whose upper ends are pivoted at 33 to ears 34 formed on the sides of the cylinder 21.

Air or other pressure fluid is admitted through pipe 22 from the hand-controlled three-way valve 74 supplied with pressure air from pipe 75 on top of piston 24, and moves the same downward, pipe 23 being vented to the atmosphere through the three-way valve 74 and vent 76.

As the piston moves downward rod 25 moves downward, causing levers 27 to swing about their pivot 26 in the end of this rod, thereby causing the shoes 28 to move both downward and inward until they engage and hold the structural shape *a* in position on the table top 3.

36 and 36$^a$ are guides fixed on a portion of the frame 5 and 37 is a tappet secured to and movable with the head 10, said guides and tappet serving to guide a vertically movable actuating rod 38, Figs. 1 and 2. This rod 38 is provided with a head 39, Fig. 2, having a slot 40 in which takes a pin 41 of a lever 42 that operates a three-way valve 43. This valve is directly connected with the pressure line pipe 44 which has a branch 45 controlled by a regulating valve 46 leading to the under side of the smaller pull-back pistons in cylinders 6 and 8. Line pressure is always maintained beneath the pistons in the smaller cylinders.

When the valve 43 is in the position shown in full lines in Fig. 2, pressure air passes through pipe 47, regulating cock 48 and pipe 49 into the top of the main cylinder 7. Pressure on top of piston 9 causes the cutter head 10 to descend and feed across the face of the work, and when the head is near the lower end of its travel the tappet 37 strikes the top of a coil spring 50 on rod 38, said spring being adjustably held in position by a collar 51 and a set-screw 52. The spring is then compressed until the pressure is sufficient to cause the retraction of a pin 53 urged by a spring 54 both mounted on a hand lever 55 pivoted at 56 to a suitable support 57 on the frame 5. One end of the lever 55 is provided with a slot 57' in which engages a pin 58 on a collar 59 secured to the rod 38.

The pin 53 engages a notch 60 on an arc 61 concentric with the pivot point 56. As soon as the latch 53 is retracted by the downward movement of the rod 38 the lever 42 is immediately brought to its lowest position. This occurs by reason of the spring 50 being compressed by tappet 37 upon the downward movement of the milling tool head, which compression takes place by reason of the rod 38 for the time being, being held against movement by the latch 53 until the tension on said spring is sufficient to force the hand lever down and automatically force the latch 53 from its retaining notch 60. As soon as the latch 53 becomes released the extension of spring 50 will cause lever 42 to close valve 43 and shut off the air supply to pipe 47. The pressure medium on top of piston 9 then passes through pipe 49, by-pass 62. valve 43, pipe 63, back to the exhaust head 64. The pressure being relieved on the upper side of piston 9 allows the pull-back pistons to move upward by reason of the line pressure being continually active on the under sides of these pistons. When the head 10 is moving to its upper position, tappet 37 strikes an adjustable stop 65 on rod 38, thus moving this rod upward, so that the three-way valve lever 42 will be moved to its central position, thus holding the pressure head 10 stationary by cutting off the exhaust from cylinder 7.

We claim—

1. In a milling machine, the combination with a movable cutter head; of an actuating piston and cylinder therefor, a pressure fluid pipe communicating with the cylinder, a retracting piston and cylinder maintained under normal actuating fluid pressure from said pipe, mechanism to manually admit the pressure fluid to the actuating piston, and means to automatically actuate said manual mechanism to release pressure fluid from the actuating piston.

2. In a milling machine, the combination with a movable cutter head; of an actuating piston and cylinder therefor, a pressure fluid pipe communicating with the cylinder, a retracting piston and cylinder maintained under normal actuating fluid pressure from said pipe, mechanism to manually admit the fluid pressure to the actuating piston, and means to automatically actuate said manual mechanism to release pressure fluid from the actuating piston and to cut off said release.

3. In a milling machine, the combination with a movable cutter head; of an actuating piston and cylinder therefor, a pressure fluid pipe communicating with the cylinder, a retracting piston and cylinder maintained under normal fluid pressure from said pipe, mechanism manually operated to admit actuating fluid to the actuating cylinder to move the piston therein and the head, means to automatically actuate said manual mechanism to release the pressure fluid from the actuating cylinder at about the end of the piston travel, thereby reversing the movement of the cutter head, and means to automatically actuate said mechanism at about the end of the reverse movement to cut off the exhaust from the actuating cylinder.

4. In a milling machine, the combination with a movable cutter head, an actuating piston and cylinder and a retracting cylinder and piston under normal fluid pressure under all conditions; of a pipe supplying pressure fluid to the actuating cylinder and retracting cylinder, a three-way valve, a by-pass between the valve and pipe, a rod for actuating the valve and means on the rod and head coöperating to actuate the rod to release pressure fluid from the actuating piston and thereafter cut off the exhaust.

In testimony that we claim the foregoing as our invention, we have signed our names in presence of two subscribing witnesses.

PAUL A. CUENOT.
LEWIS G. FISCHER.

Witnesses:
 CHAS. R. HOLTON,
 A. F. LEEDS.